United States Patent
Habusha et al.

(10) Patent No.: US 10,261,935 B1
(45) Date of Patent: Apr. 16, 2019

(54) MONITORING EXCESSIVE USE OF A PERIPHERAL DEVICE

(71) Applicant: Amazon Technologies, Inc., Seattle, WA (US)

(72) Inventors: Adi Habusha, Moshav Alonei Abba (IL); Leah Shalev, Zichron Yaakov (IL); Nafea Bshara, San Jose, CA (US); Said Bshara, Tira (IL)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 15/280,455

(22) Filed: Sep. 29, 2016

(51) Int. Cl.
*G06F 13/12* (2006.01)
*G06F 13/42* (2006.01)
*G06F 9/455* (2018.01)
*H04W 84/12* (2009.01)
*H04L 29/06* (2006.01)

(52) U.S. Cl.
CPC ...... *G06F 13/4282* (2013.01); *G06F 9/45558* (2013.01); *G06F 2009/45579* (2013.01); *G06F 2213/0026* (2013.01); *H04L 65/102* (2013.01); *H04W 84/12* (2013.01)

(58) Field of Classification Search
None
See application file for complete search history.

(56) References Cited

U.S. PATENT DOCUMENTS 9,183,054 B2 * 11/2015 Arges .................... G06F 9/5011

* cited by examiner

*Primary Examiner* — Cheng Yuan Tseng
(74) *Attorney, Agent, or Firm* — Kilpatrick Townsend & Stockton LLP

(57) ABSTRACT

Provided are systems and methods for detecting excessive use of a peripheral device by host processes. In various implementations, a peripheral device can include an integrated circuit that includes a traffic counter. The traffic counter can increment based on events received by the peripheral device. The peripheral device can further include an integrated circuit device configured to associate the traffic counter with a process executing on a host device. The integrated circuit device can further initialize a rate counter for the process. When the rate counter reaches a predetermined time limit, the integrated circuit device can determine that the process is exceeding a usage limit. The integrated circuit device can further read a value from the traffic counter to verify usage of the peripheral device by the process.

20 Claims, 7 Drawing Sheets

MONITORING EXCESSIVE USE OF A PERIPHERAL DEVICE

BACKGROUND

Computing systems generally include peripheral devices. A peripheral device is a device that can extend, adapt, and/or modify the functionality of the computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

A computing system can include a host device in communication with a peripheral device. Processes, such as virtual machines, executing on the host device may use the resources provided by the peripheral device. For example, the processes can send transactions to the peripheral device, for the peripheral device to process. The transactions can involve, for example, storage device accesses, network packets, computations, or some other functionality provided by the peripheral device.

BRIEF DESCRIPTION OF THE DRAWINGS

Various embodiments in accordance with the present disclosure will be described with reference to the drawings, in which.

DETAILED DESCRIPTION

Figure 1:
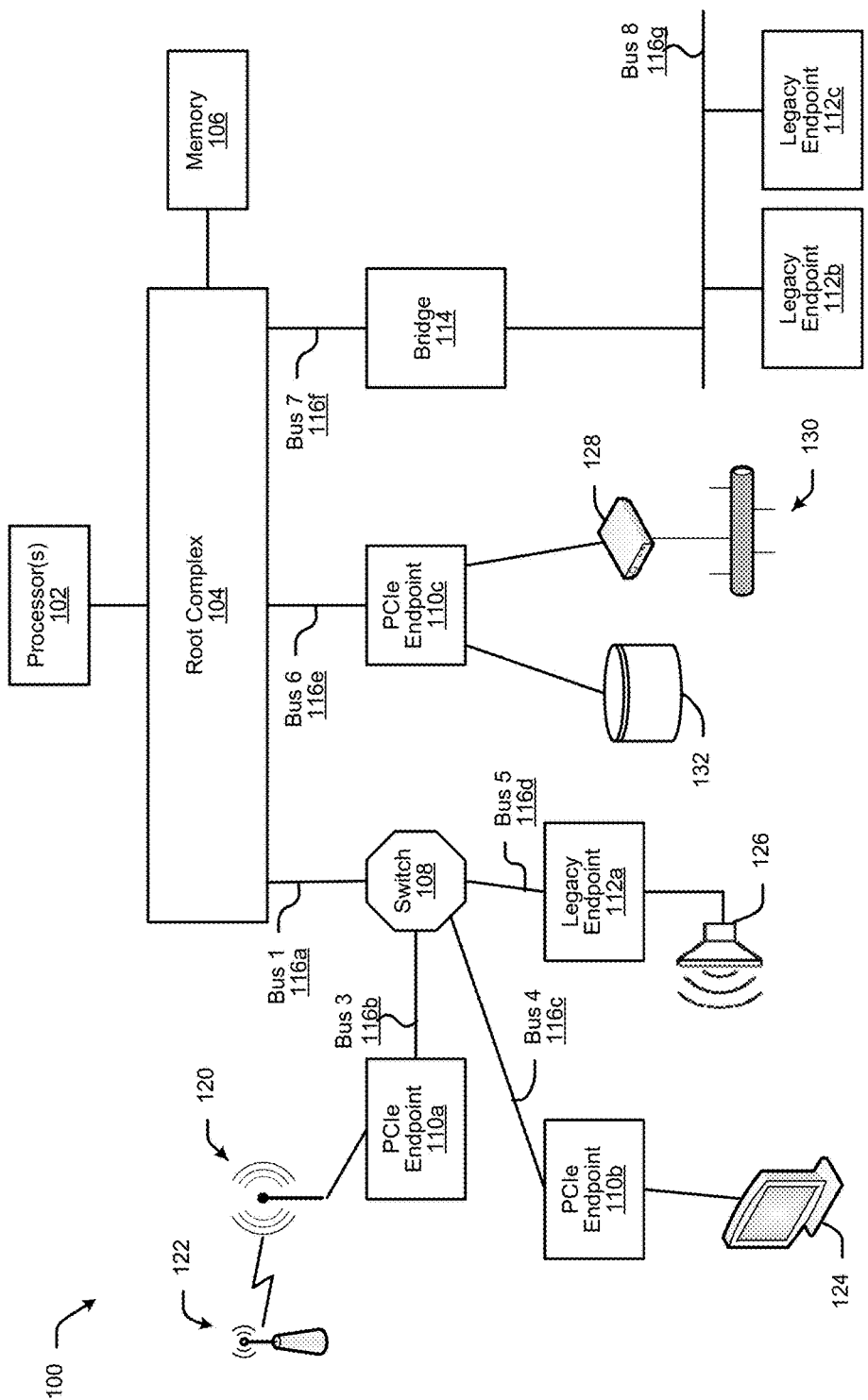
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems generally include peripheral devices. A peripheral device is a device that can extend, adapt, and/or modify the functionality of the computing system. For example, peripheral devices may provide storage, network connectivity, and/or audio and video support to a computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

A computing system can include a host device and a number of peripheral devices.

Processes executing on the host device may make use of resources provided by the peripheral devices. Examples of processes executing on the host device include an operating system and user applications (e.g., word processing, spreadsheet, web browsing, gaming, graphics editing, and other applications). Other examples of processes executing on a host device include virtual machines. Examples of resources provided by the peripheral devices include storage interfaces, network interfaces, and graphics processing, among others. To use the resources provided by a peripheral device, a process executing on a host device can send transactions to the peripheral device, such as read and write transactions. The read and write transactions can be memory transactions or Input/Output (I/O) transactions, among others. The peripheral device typically processes the transactions, where the processing can include performing operations (e.g., calculations), moving data to or from I/O devices, or transferring data over a network, among other activities.

On various occasions, a process executing on a host device can send large number of transactions to a peripheral device for the peripheral device to execute. The large number of transactions can fully occupy the peripheral device until the peripheral device processes each transaction. When only one process has use of the peripheral device, such monopolization of the peripheral device's resource may be acceptable. But when multiple processes executing on the host device use the peripheral device, the large number of transactions from the one process can create a fairness problem: by occupying all the resources of the peripheral device, transactions from other processes may be delayed, possibly indefinitely. In some cases, monopolization of the peripheral device may be a deliberate attempt at denial of service to the other processes. Denial of service occurs when the peripheral device is so occupied by one process that other processes either cannot have their transactions handled in a timely fashion, or the other processes are completely unable to make use of the peripheral device.

Generally, a host device is able to arbitrate between processes attempting to use a peripheral device. For example, when the processes are virtual machines, a hypervisor typically manages the virtual machines' use of hardware resources, such as peripheral devices. Alternatively or additionally, the peripheral device may have software and/or hardware that attempt to fairly allocate the peripheral device's resources among different host device processes. For example, a peripheral device may be a "passthrough" device, in which case processes executing on the host device have direct access to the hardware of the peripheral device. In these types of devices, the peripheral device may include hardware and/or software that ensure that transactions from different process do not conflict. To do so, the hardware and/or software may arbitrate between each process's use of the peripheral device. In various implementations, a process may report to the peripheral device a number of transactions that the process intends for the peripheral device to execute. Using this number, the peripheral device can determine which process's transactions are going to be executed, and/or how many of each process's transactions are going to be executed. In a passthrough device, however, drivers used by the host processes can execute independently of, and transparently through the hypervisor, meaning that the hypervisor may not monitor the processes' use of the hardware. In such a case, a process can misuse the hardware by misusing properly authorize, non-malicious driver capabilities.

In some situations, however, a process may report one number of transactions to a peripheral device, but execute a different number of transactions. For example, the process may inform the peripheral device that the process will execute five transactions, but then proceed to send five thousand transactions to the peripheral device. This may occur, for example, because the code for the process is defective, and is either reporting an incorrect number of transactions to the peripheral device, or is sending an incorrect number of transactions, or both. Alternatively or additionally, the process may be infected with malware, such that the process is deliberately and maliciously attempting to deny use of the peripheral device to other processes. In either case, an action that restores service to other processes may be necessary.

In some implementations, processes executing on a host device may be subject to service level agreements. A service level agreement (SLA) can determine the level of usage of a peripheral device that is allocated to a particular process. For example, the process may be restricted to a certain amount of bandwidth (e.g., storage bandwidth, network bandwidth, computing bandwidth, etc.) provided by a peripheral device. Service level agreements, however, are generally monitored over extended periods of time, such as multiple minutes or hours. In some situations, a process may report to the peripheral device that the process is going to send, for example, five thousand transactions, and proceed to send five thousand transactions, which can occupy the peripheral device for, for example, several milliseconds. While the five thousand transactions may monopolize the peripheral device during those several milliseconds, should the process return to normal usage of the peripheral device, the process's momentary spike in traffic may not be detected by hardware and/or software that is enforcing service level agreements. During those several milliseconds, however, use of the peripheral device may be denied to other processes.

In various implementations, a peripheral device can include hardware and software for detecting a denial of service situation caused by a process executing on a host device. In various implementations, a peripheral device can include one or more traffic counters. The traffic counters can count transactions, or aspects of transactions (e.g., whether the transaction was a read or a write, whether the transaction was to an I/O address or a memory address, the number of bytes read or written by the transaction, or some other aspect of the transaction) sent to the peripheral device by a process running on a host device. Generally, the peripheral device can assign a set of traffic counters to each process that is using the peripheral device, so that a set of data can be produced from the set of counters that is specific to one process. The traffic counters can be used, for example, for statistics and/or monitoring the performance of the various processes and/or of the peripheral device.

In various implementations, a peripheral device can also include a rate counter for each process that is using the peripheral device. The peripheral device can use the rate counter to periodically check on a process's usage of the peripheral device. For example, the rate counter can determine whether a certain amount of time has elapsed. When the rate counter reaches a pre-determined time limit, the peripheral device can verify whether the process that is associated with the rate counter is sending an excessive amount of traffic to the peripheral device. When the process is sending an acceptable mount of traffic, the peripheral device can reset the rate counter, and take no further action. When the process is sending an amount of traffic that exceeds a usage limit, the peripheral device can verify the usage of the peripheral device by the process. Specifically, the peripheral device can read the traffic counters, and use values read from the traffic counters to verify the process's actual usage of the peripheral device. For example, the peripheral device can compare the value from the traffic counter against the number of transactions reported by the process as the number of transactions the process was going to send. When the value from the traffic counter is much greater than the reported number of transactions, the process may be defective, or may be acting maliciously.

In various implementations, when the peripheral device has identified a process that is making excessive use of the peripheral device, the peripheral device can take an action. For example, the peripheral device can throttle transactions from the process, for example by servicing fewer transactions than the process sends. Alternatively or additionally, the peripheral device can block transactions from the process, or not process transactions from the process. Alternatively or additionally, the peripheral device can report the process, for example to the host device and/or to a system administrator.

FIG. 1 illustrates an example of a computing system 100 that includes multiple peripheral devices. Peripheral devices may include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. The peripheral devices illustrated in FIG. 1 can also include peripheral devices that implement bus protocols that are based on a PCI bus protocol, such as Non-Volatile Memory Express (NVMe), a bus protocol used for high-speed storage disks and that operates on top of a PCIe bus.

In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-c and legacy endpoints 112a-c. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors. In some cases, memory may also be integrated into the host system.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example Small Computer System Interface (SCSI), Serial ATA (SATA), or Parallel ATA (PATA), among others.

The switch 108 functions as a multi-port connector between various devices, including the root complex 104, peripheral devices, and possibly other switches and bridges. The switch 108 may route transactions between any of the devices connected to it. For example, the switch 108 may route transactions between the PCIe endpoints 110a-b and the legacy endpoint 112a, and between the various endpoints 110a-b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example, the legacy endpoints 112b-c are connected to a shared PCI bus 116g. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 110-c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116e. Similarly, the bridge 114 is connected to the root complex with Bus 7 116f. Each of the PCIe endpoints 110a-b and the legacy endpoint 112a are also connected to the switch 108 with individual busses 116b-d. The connections between each of the root complex 104, the switch 108, the bridge 114, the PCIe endpoints 110a-c and the legacy endpoint 112a are point-to-point because each of the busses 116a-g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 116a (Bus 0 may be internal to the root complex 104). Similarly, each of the busses connecting the PCIe endpoints 110a-b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116e, while the connection between the root complex and the bridge 114 may be labeled Bus 7 116f. Finally, the shared bus downstream from the bridge 114 may be labeled Bus 8 116g. In most cases the numbering of the busses is arbitrary, though bus numbers are generally assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116a, 116e, 116f connected to the root complex 104, and identify the switch 108, the PCIe endpoint 110c, and the bridge 114. Upon discovering the switch 108, the processors 102 may next scan the busses 116b-d connected to the switch 108. The processors 102 thereby discover the PCIe endpoints 110a-c and the legacy endpoint 112a. Upon discovering the bridge 114, the processors 102 may also scan Bus 8 116g; however, the bridge 114 may translate the scanning instructions to the protocol implemented by Bus 8 116g.

While scanning the busses, or possibly after, the processors 102 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

Figure 2:
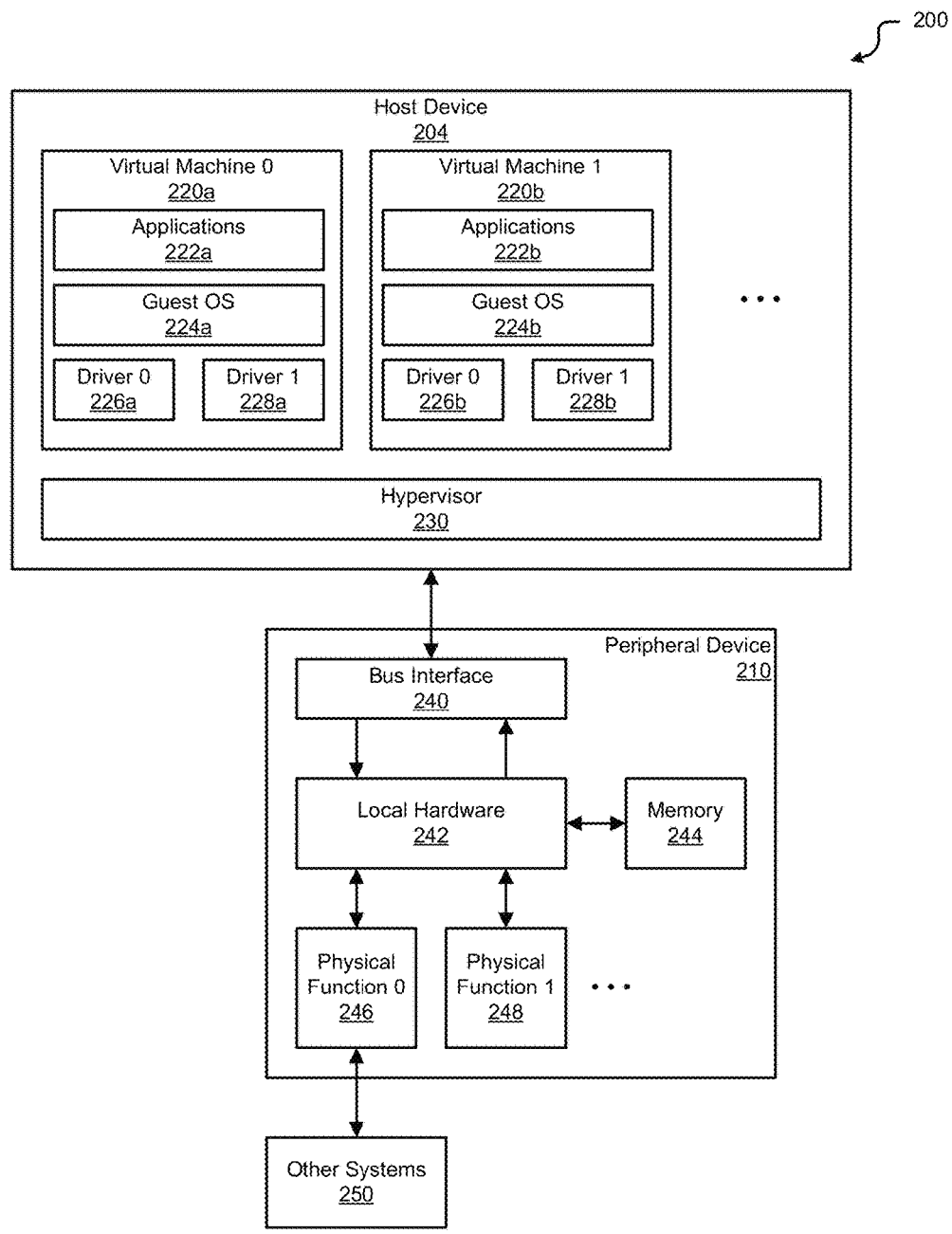
FIG. 2 illustrates an example of a system that includes a host device and a peripheral device.

FIG. 2 illustrates an example of a system 200 that includes a host device 204 and a peripheral device 210. The peripheral device 210 may be providing additional functionality to the host device 204, such as networking interfaces, storage device interfaces, and/or processing resources. The host device 204 can include a process that may, accidentally or intentionally, make excessive usage of the peripheral device, such that other processes cannot, at least momentarily, use the peripheral device. As discussed further below, in various implementations, the peripheral device 210 can detect such excessive usage.

In various implementations, processes executing on the host device 204 can include one or more virtual machines 220a, 220b. A virtual machine is an emulated computer system running on the hardware of a physical computer system (e.g., the host device 204 in this example). As illustrated in the example of FIG. 2, a virtual machine 220a, 220b typically executes its own operating system, often referred to as a guest operating system (guest OS) 224a, 224b, which may be different than the operating system running on the underlying physical computer system. The virtual machine 220a, 220b may also provide user applications 222a, 222b, which have access only to the resources provided by the virtual machine 220a, 220b. The virtual machine 220a, 220b may make some or all of the resources of the host device 204 available to its guest operating system 224a, 224b and applications 222a, 222b. Alternatively or additionally, the virtual machine 220a, 220b may present emulated physical resources to its guest operating system 224a, 224b or applications 222a, 222b. A virtual machine 220a, 220b typically uses physical resources through a driver program 226a-226b, 228a, 228b. The physical computer system may be able to host multiple virtual machines, with the virtual machines sharing the physical computer system's hardware resources. Typically, software called a hypervisor 230 manages the virtual machines 220a, 220b, as well as the physical hardware resources that are available to each virtual machine 220a, 220b. In the example of FIG. 2, though two virtual machines 220a, 220b are illustrated, the host device 204 may include more than two virtual machines.

The hardware being made available to the virtual machines 220a, 220b can include the peripheral device 210. In various implementations, the peripheral device 210 can include a bus interface 240, local hardware 242, memory 244, and physical functions 246, 248. The bus interface 240 can provide a communication interface between the peripheral device 240 and the host device 204. For example, the bus interface 240 can be a PCI-based bus interface, and enable the peripheral device 210 to communicate with the host device 204 over a PCI-based interconnect. In various implementations, the bus interface 240 can managing incoming transactions from the virtual machines 220a, 220b and/or other processes executing on the host device 204. Managing incoming transactions can include managing the physical connection to the host device 204, accepting transactions addressed to the peripheral device 210, deconstructing transactions, and/or translating transactions into a format that can be more easily processed by the remained of the peripheral device 210, including the local hardware 242.

In various implementations, the local hardware 242 can include integrated circuits, such as processors, Systems-on-a-Chip (SoCs), Application Specific Integrated Circuits (ASICs) and/or Field Programmable Gate Arrays (FPGAs), as well as registers, interconnects, clock generators, switches, light emitting diodes (LEDs) and other hardware that can support the functions of the integrated circuits and the physical functions 246, 248. In various implementations, the integrated circuits can enable or facilitate the operations of the peripheral device 210. For example, the local hardware 242 can include a processor, where the processor executes code that can enable the peripheral device to emulate one or more specific devices. For example, the processor can receive read transactions to configuration addresses of a specific peripheral device, and can provide values stored, for example, in the memory 244. As another example, the local hardware 242 can include an integrated circuit capable of executing firmware, where the firmware is able to emulate one or more specific devices.

The memory 244 can include volatile and/or non-volatile local data storage that can be used by the local hardware 242. For example, the local hardware 242 can use the memory 244 to store emulated configurations that the local hardware 242 can use to emulate various peripheral devices. As another example, the memory 244 can serve as temporary storage for transactions that are being processed, or will be processed, by the peripheral device. As another example, the memory 244 can be used by the physical functions 246, 248 to store data being processed by the physical functions 246, 248. In various implementations, the memory 244 can include Random Access Memory (RAM), Dynamic RAM (DRAM), Static RAM (SRAM), read only memory (ROM), or Electrically Erasable Programmable ROM (EEPROM), some other memory type, or a combination of memories.

In some cases, processes executing on the host device 204, such as the virtual machines 220a, 220b, can write directly to peripheral device's 210 memory 244. For example, the peripheral device 210 can be a "passthrough" device. When the peripheral device 210 is a passthrough device, processes such as the virtual machines 220a, 220b can be given direct access to the hardware of the peripheral device 210, including, for example, the peripheral device's 210 memory. This may be more efficient than requiring the virtual machines 220a, 220b to arbitrate, through the hypervisor 230, for use of the peripheral device 210. To avoid transactions from different the virtual machines 220a, 220b, from conflicting (e.g., by writing to the same memory location in the peripheral device 210 at the same time), the peripheral device 210 can include an Input/Output Memory Management Unit (IOMMU). An IOMMU can allocate a certain amount of the peripheral device memory 244 to each virtual machine 220a, 220b, and further translate addresses used by the virtual machines 220a, 220b into addresses in their allotted regions. The IOMMU can thus provide isolation between the virtual machines 220a, 220b, as the virtual machines 220a, 220b use the peripheral device 210.

The virtual machines' 220a, 220b use of the peripheral device 210 generally includes using the peripheral device's 210 physical functions 246, 248. In this example, the peripheral device 210 includes two physical functions 246, 248, and in other examples the peripheral device can include one physical function or more than two physical functions. The physical functions 246, 248 can include hardware and/or software that enable a specific peripheral device operation. Examples of peripheral device operations include storage device interfaces, network interfaces, and graphic processing units (GPUs), among others. In some cases, a physical function 246, 248 can communicate with other systems 250. For example, a physical function implementing a storage interface may communicate with external storage devices. As another example, a physical function implementing a network interface may communicate with devices on a network. In some implementations, one or more physical functions 246, 248 may be disabled when the peripheral device 210 is connected to one host device 204, and may be enabled when the peripheral device 210 is connected to another host device 204. In various implementations, the local hardware 242 may include hardware and/or software that enable the peripheral device 210 to emulate a particular physical device operation. For example, Physical Function 0 246 may be a network interface. In this example, in one configuration, the peripheral device may be able to emulate a particular 10 gigabit (Gb) network interface, and in another configuration, the peripheral device may be able to emulate a different 100 Gb network interface.

In some implementations, the peripheral device 210 may be virtualized. "Virtualized" can mean that the peripheral device 210 provides a certain number of virtual functions (VFs) for each physical function. For example, the peripheral device 210 may provide 32 or 64 or some other number of virtual functions for each physical function 246, 248. Each virtual function can be assigned to a process executing on the host device 204. For example, VF1 for Physical Function 0 246 can be assigned to Virtual Machine 0 220*a*, and VF2 for Physical Function 1 246 can be assigned to Virtual Machine 1 220*b*. A virtual function generally provides the same functionality as is provided by the underlying physical function. Virtual functions, however, give a virtual machine 220*a*, 220*b* the appearance of having exclusive use of the physical function 246, 248. The virtual machines 220*a*, 220*b* are thus unaware that they are sharing the physical functions 246, 248 with another process, and do not need to arbitrate for use of the physical functions 246, 248. Generally, the peripheral device 210 itself manages the shared use of the physical functions 246, 248, in some cases with assistances from the host device 204.

Generally, the applications 222*a*, 222*b* and guest operating systems 224*a*, 224*b* executing the virtual machines 220*a*, 220*b* access the physical functions 246, 248 though a driver program 226*a*, 226*b*, 228*a*, 228*b*. For example, each virtual machine 220*a*, 220*b*, can include one driver, Driver 0 226*a*, 226*b*, that provides a communication path to Physical Function 0. For example, when Physical Function 0 246 is a storage interface, Driver 0 226*a*, 226*b* may provide storage read and write commands to the applications 222*a*, 222*b* and the guest operating systems 224*a*, 224*b*, and may further translate the storage read and write commands for transfer over the communication interface to the peripheral device 210. Similarly, the virtual machines 220*a*, 220*b* can include a Driver 1 228*a*, 228*b* that provides communication with Physical Function 1 248.

In some implementations, the drivers 226*a*, 226*b*, 228*a*, 228*b* operate in cooperation with software and/or firmware running on the local hardware 242. For example, when the peripheral device 210 is a PCIe device, the Driver 0 226*a* can write a register called a doorbell register located on the local hardware 242 of the peripheral device 210. The doorbell register can be used in various different ways. For example, when Physical Function 0 246 provides a storage device interface, the doorbell register can be used to indicate a number of transactions for transferring data to a storage device. The peripheral device 210 can use this number to schedule the transactions. For example, if an application 222*b* in Virtual Machine 1 220*b* has fifty transactions to send and an application 222*a* in Virtual Machine 0 220*a* has five, the peripheral device 210 may schedule the transactions from Virtual Machine 0 220*a* first, since they can be completed faster. Once Driver 0 226*a* writes the doorbell register, the local hardware 242 can fetch the data and write the data to the storage device, without needing further assistance from Driver 0 226*a* or the application 222*a* that requested the data transfer. In some implementations, the local hardware 242 may fetch the data from host device 204 memory. In some implementations, the application 222*a* may transfer the data to the peripheral device 210 memory 244 prior to writing the doorbell register.

In the various implementations discussed above, it may not be possible for the peripheral device 210 to control the rate of transactions coming in from the virtual machines 220*a*, 220*b* or other processes executing on the host device 204. For example, when the peripheral device 210 is configured as a passthrough device, the virtual machines 220*a* 220*b* an have direct access to the local hardware 242 and/or memory 244. As another example, when the peripheral device 210 is virtualized, each virtual machine 220*a* 220*b*, may use the peripheral device 210 as though each virtual machine 220*a*, 220*b* has exclusive use of the peripheral device 210. In any of these examples, the hypervisor 230 may not be arbitrating between the virtual machine's 220*a*, 220*b* use of the peripheral device 210, and/or the peripheral device 210 may simple have to handle transactions as they arrive.

Ordinarily, when the system 200 is operating correctly and error free, the virtual machines 220*a*, 220*b* should be using the peripheral device 210 fairly and equitably. Errors, malicious software, or simple accidents, however, can cause one virtual machine 220*a* to send an excessive amount of traffic to the peripheral device 210. The peripheral device 210 will process the traffic, but while the peripheral device 210 is processing the traffic, transactions from the other virtual machine 220*b* cannot be processed. The one virtual machine 220*a*, may thus be denying service to the other virtual machine 220*b*.

In some cases, the denial of service may be due to an error in an application 222*a*, 222*b* or the guest operating system 224*a*, 224*b* may cause a virtual machine 220*a*, 220*b* to make excessive and unfair use of the peripheral device 210. In other cases, a virtual machine 220*a*, 220*b* may be infected with malware. In either case, what may occur is that a virtual machine 220*a* may send far more transactions that the virtual machine 220*a* indicated that it would send.

For example, an application 222*a* in Virtual Machine 0 220*a* may cause a doorbell register to be written, where the value written to the doorbell register indicates that the application 222*a* wants to send five transactions. In this example, when application 222*a* may instead send 5000 transactions, which the peripheral device 210 will proceed to process, without being aware that the application 222*a* has mistakenly or intentionally reported that it was going to send only five transactions. This may occur, for example, because the peripheral device 210 reads the transactions from an array or linked list, and simply continues until it reaches the end of the array or linked list.

In other cases, an application 222*a* in Virtual Machine 0 220*a* may report that it is going to send 5000 transactions, and actually have 5000 transactions to send. Though not violating any protocol in this case, the application 222*a* may nevertheless monopolize the peripheral device 210 for a short time, denying use of the peripheral device 210 to the Virtual Machine 1 220*b*. The 5000 transactions may also be more bandwidth than is allotted to Virtual Machine 0 220*a*, as indicated by a service level agreement. The 5000 transactions may take only a few milliseconds to process, however, and hardware and/or software that is enforcing the service level agreement generally monitors the peripheral device's 210 usage over the span of hours or minutes. Thus, the service level agreement may not prevent the virtual machine 220*a* from at least momentarily monopolizing the peripheral device 210.

Figure 3:
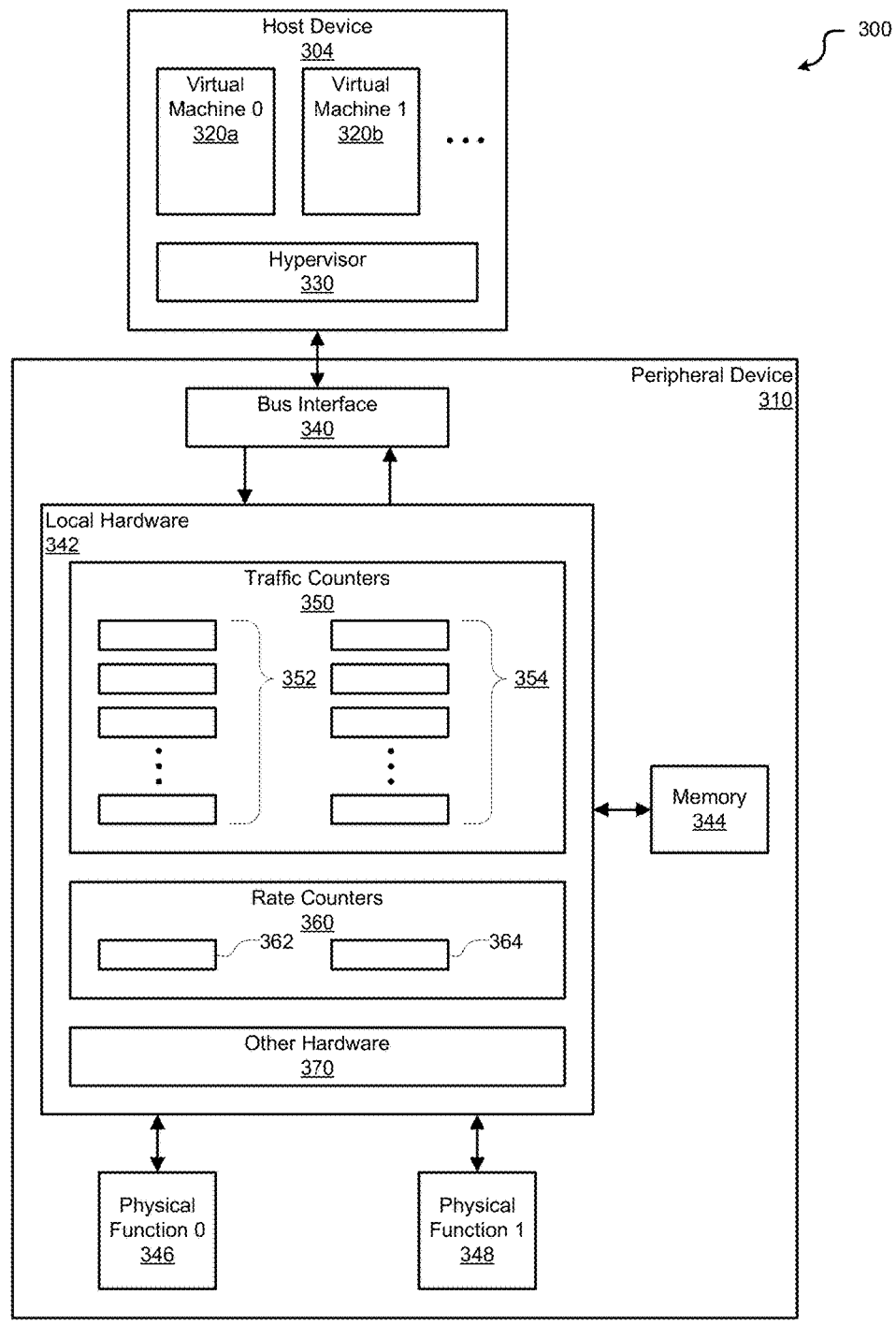
FIG. 3 illustrates an example of a system that includes a host device in communication with a peripheral device, where the peripheral device includes hardware and/or software that is able to detect excessive use of the peripheral device.

In various implementations, a peripheral device can thus include hardware and/or software that can detect momentary bursts of traffic that may cause one process to make excessive use of the peripheral device. FIG. 3 illustrates an example of a system 300 that includes a host device 304 in communication with a peripheral device 310, where the peripheral device 310 includes hardware and/or software that is able to detect excessive use of the peripheral device 310. As discussed further below, the peripheral device 310 may be able to detect bursts of traffic from one or another virtual machine 320a, 320b executing on the host device 304 that may exceed an acceptable usage level.

The host device 304 can include one or more virtual machines 320a, 320b, as well as other processes that may use the peripheral device 310. The virtual machines 320a, 320b may be managed by a hypervisor 330. The hypervisor 330 typically controls the virtual machines' 320a, 320b access to the hardware of the host device 304. This hardware can include the peripheral device 310.

In various implementations, the peripheral device 310 can include a bus interface 340, local hardware 342, memory 344, and physical functions 346, 348. The bus interface 340 can provide a communication interface between the peripheral device 310 and the host device 304. For example, the bus interface 340 can be a PCI-based bus interface, and enable the peripheral device 310 to communicate with the host device 304 over a PCI-based interconnect. The memory 344 can provide local data storage. In various implementations, the local hardware 342 can use the memory 344 to permanently or temporarily store data that the local hardware 342 is operating on. In various implementations, processes executing on the host device 340 may be able to write or read directly to or from the memory 344. The physical functions 346, 348 can include hardware and/or software that provide a specific peripheral device operation, such as a storage interface, a network interface, or a graphics processing unit, among other things.

The local hardware 342 can include integrated circuits, such as processors, SoCs, ASICS, FPGAs, and/or other supporting hardware, that enables the peripheral device 310 to provide various operations to the host device 304. The local hardware 342 can include, as discussed further below, traffic counters 350, rate counters 360, and as well as other hardware 370. The other hardware can, for example, can include hardware and/or software that enables the peripheral device 310 to emulate various specific peripheral devices In various implementations, the local hardware 342 can include a number of traffic counters 350. The traffic counters 350 count transactions and/or aspects of transactions received by the peripheral device 310. For example, one traffic counter may count all transactions received, while another traffic counter counts only read transactions received and another traffic counter counts only write transactions. Aspects of transactions that may be counted include, for example, the amount of data transferred by read transactions, the amount of data transferred by write transactions, addresses used by the transactions, address regions being accessed by the transactions, address boundaries involved in the transactions (e.g., the number of cache lines crossed by the transactions), how many of the transactions were I/O transactions, how many of the transactions were memory transactions, how many of the transactions were configuration transactions or transactions to a particular configuration register, and so on.

In various implementations, one or more of the traffic counters 350 can alternatively or additionally be configured to count "effects" of network traffic received by the peripheral device 310. Effects include the manner in which the memory, processing resources, other hardware, and/or firmware may be used by the network traffic. For example, effects can include memory effects. In this example, a memory access pattern can be, for example, a process opening and closing different memory pages one after another. Such a memory access pattern can occupy a large amount of memory bandwidth, limiting the use of the memory to other processes. In this example, traffic counters 350 can be configured to count memory pages being opened and memory pages being closed, and the values from these counters can be correlated to identify a pattern of excessive page switching. As another example, effects can include transactions that require the attention of processing resources on the peripheral device 310. In this example, a process may send many transactions that each require, for one reason or another, a processor to examine and handle the transaction. Such a transaction stream may cause the processor to spend too much time handling the transactions, taking the processor away from other tasks. In this example, a traffic counter 350 can be configured to count transactions that require processor attention.

The values maintained by the traffic counters 350 can be used, for example, for statistical analysis of the use of the peripheral device 310, or for performance monitoring, to see if the peripheral device 310 is performing as desired.

Generally, the traffic counters 350 may be implemented in sets 352, 354, where each set 352, 354 of traffic counters 350 include similar individual traffic counters. The peripheral device 310 can associated a set 352, 354 of traffic counters 350 to one process executing on the host device 304. For example, the peripheral device 310 can associate a first set 352 with Virtual Machine 0 320a, and a second set 354 with Virtual Machine 1 320b. Each set 352, 354 of traffic counters 350 can thus maintain counts for each individual virtual machine 320a, 320b. In various implementations, the traffic counters 350 may be implemented in integrated circuit devices, such as an ASIC or FPGA. In various implementations, the traffic counters 350 may be implemented as integrated circuits in the bus interface 340. In various implementations, the traffic counters 350 are "free running," meaning that the counters In various implementations, the local hardware 343 can also include rate counters 360. The peripheral device 310 can associate individual rate counters 360 with processes executing on the host device 304. For example, the peripheral device 342 can associate a first rate counter 362 with Virtual Machine 0 320a, and a second rate counter 364 with Virtual Macine 1 320b. In various implementations, the rate counters 360 may increment based on time. For example, the rate counters 360 may count microseconds, milliseconds, clock cycles, or some other fraction of a second. In various implementations, the rate counters 360 can be implemented in hardware, such as for example in an integrated circuit device, or in software, such as for example in firmware executing on an integrated circuit in the local hardware 342.

In various implementations, the peripheral device 310 can use the rate counters 360 to periodically check on each virtual machine's 320a, 320b usage of the peripheral device 310. For example, the peripheral device 310 may be configured with a time limit, which may be associated with a specific rate counter 362. In this example, when the rate counter 362 reaches the time limit, the peripheral device 310 may check on a virtual machine (e.g. Virtual Machine 0 320a) that is associated with the rate counter 362, and determine whether the virtual machine 320a is currently exceeding a usage limit. When the virtual machine 320a does not appear to be using monopolizing the peripheral device 310, the peripheral device 310 can reset the rate counter 362 and take no further action. When the virtual machine 320a does appear to be using the peripheral device 310 excessively, the peripheral device 310 can take further action, as discussed further below. In various implementations, the peripheral device 310 can include different time limits for each of the rate counter 360. In various implementations, the rate counters 360 can also be configured to increment at different rates. For example, one rate counter 362 may be counting milliseconds, while another rate counter 364 may be counting microseconds.

The peripheral device 310 can verify the virtual machine's 320 current usage of the peripheral device 310 in various ways. For example, the peripheral device 310 can include hardware and/or software that tracks which process was using the peripheral device 310 the last time a particular rate counter 362 expired. In this example, when the same process (e.g. Virtual Machine 0 320a) was using the peripheral device 310 the last time this particular rate counter 362 expired as well at the current time, it may be that this process has been using the peripheral device 310 during the entire interval counted by the rate counter 362. The process's usage during this time may exceed a usage limit. As another example, the peripheral device 310 may have an independent counter that counts transactions received from the process that is currently using the peripheral device 310, which resets when a different process starts using the peripheral device. In this example, when a particular rate counter 362 expires, the peripheral device 310 can check the number of transactions counted by the independent counter. When the number of transactions is very high, it may be that the current process is exceeding a usage limit of the peripheral device 310.

In a various implementations, when the peripheral device 310 determines that, when a rate counter 360 expires, a process currently using the peripheral device 310 may be exceeding a usage limit, the peripheral device 310 can then verify whether the process is, in fact, using the peripheral device 310 excessively. Verification may show that the process is not, in fact, monopolizing the peripheral device 310. For example, when the peripheral device 310 finds that the same process was using the peripheral device the last time a rate counter 360 expired as at the current time, it may be that other processes used the peripheral device 310 in the intervening time. As another example, when the peripheral device 310 counts transactions sent by the same process, it may be that these transactions were for consecutive, unrelated requests, or happened because no other process requested use of the peripheral device.

In various implementations, the peripheral device 310 can verify one process's use of the peripheral device by reading the set 352, 354 of traffic counters 350 associated with the process. In some implementations, the hardware and/or software that monitor the rate counters 360 may send an interrupt signal to a processor or firmware that is managing the operations of the peripheral device 310. In these implementations, the processor or firmware may read the set 352, 354 of traffic counters 350 associated with the process that appears to be exceeding usage of the peripheral device 310.

In various implementations, each time a rate counter 360 reaches its respective rate limit, the local hardware 342 may send an interrupt to the firmware. In these implementations, the local hardware 342 may not include hardware or software that verifies a process's current use of the peripheral device 310. Instead, the firmware may verify the process's use by reading the traffic counters 350 and examining the values read from the traffic counters 350.

In various implementations, a processor, firmware, or some other hardware and/or software on the peripheral device 310 may use the values read from the traffic counters 350 to verify the process's actual usage of the peripheral device 310. For example, in various implementations, the peripheral device 310 can compare a number of transactions reported to it by, for example, Virtual Machine 0 320a as the number of transactions that Virtual Machine 0 320a was going to send against an actual number of transactions sent, as indicated by one or more traffic counters 350. For example, the peripheral device 310 can compare a number of transactions written by Virtual Machine 0 320a in a doorbell register against a traffic counter 350 that counts all transactions sent by Virtual Machine 0 320a. When the actual number of transactions sent is greater than the number of transactions originally reported to the peripheral device 310, the process may be accidentally or deliberately trying to monopolize use of the peripheral device 310. The peripheral device 310 may subsequently take some further action, as discussed further below.

In some cases, the actual number of transactions sent are the same (or at least close to) the number of transactions that a process indicated that it was going to send. The number of transactions reported, however, may nevertheless be excessively large, such that processing that many transactions may cause the process to monopolize use of the peripheral device 310. The peripheral device 310 may be configured, for example, with a threshold that indicates whether a number of transactions that a process will send exceed a usage limit. In these cases, though the process has not violated any protocol, the process may nevertheless be using the peripheral device to the exclusion of other processes.

In various implementations, when a process is exceeding allowed use of the peripheral device 310, the peripheral device 310 can take an action against the process. For example, the peripheral device 310 can block further transactions from the process, or stop accepting transactions from the process. As another example, the peripheral device 310 can drop any transactions from the process that are still pending. As another example, the peripheral device 310 can throttle transactions from the process, for example, by reducing the number of transactions that the peripheral device 310 accepts from the process. In various implementations, the peripheral device 310 can, alternatively or additionally, report the offending process to the host device 304 and/or a system administrator, who can take further action against the process.

Figure 4:
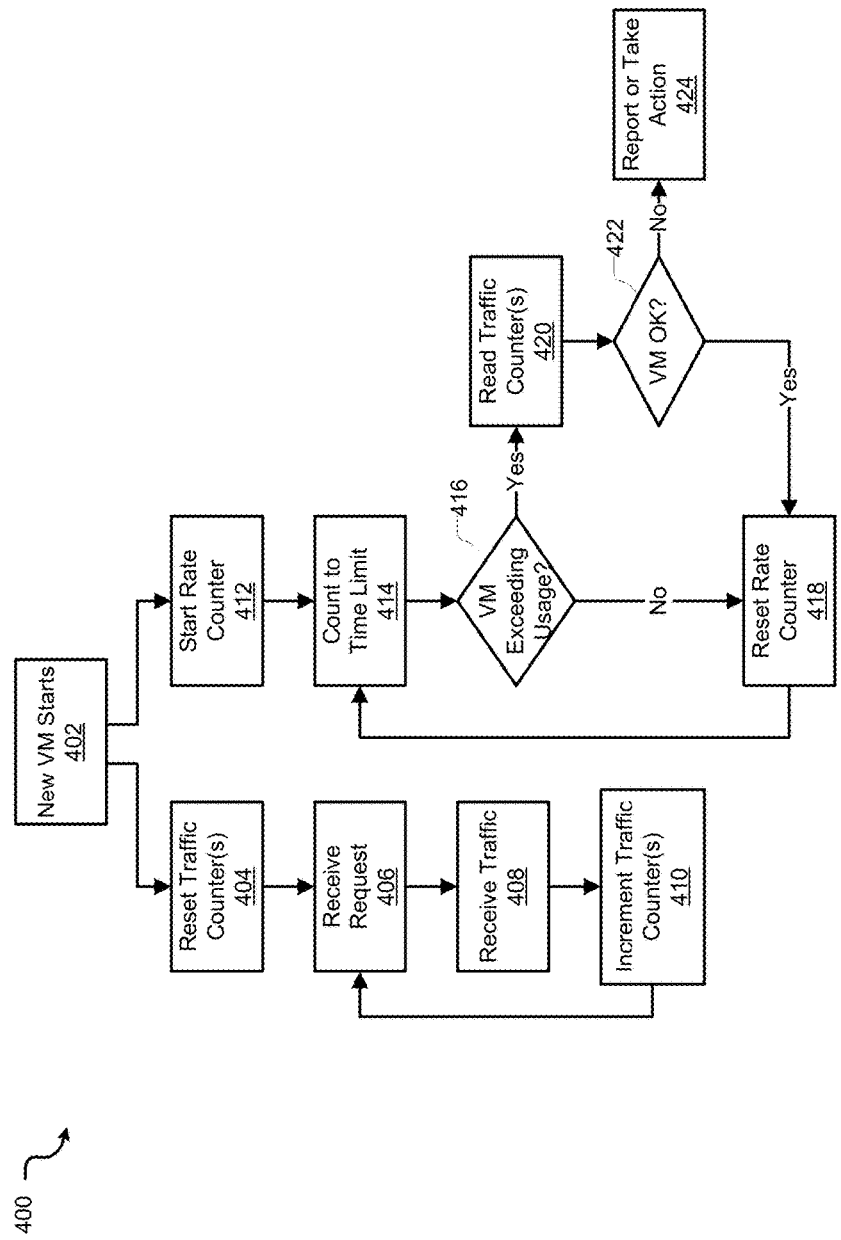
FIG. 4 illustrates an example of a process that can be executed by a peripheral device that is monitoring host device processes for excessive use of the peripheral device.

FIG. 4 illustrates an example of a process 400 that can be executed by a peripheral device that is monitoring host device processes for excessive use of the peripheral device. The example process 400 can be implemented in the hardware and/or software of the peripheral device, and/or can be implemented by different, concurrently executing hardware and/or software.

In various implementations, the process 400 may begin, at step 402, when a new process, such as a virtual machine (VM), starts on a host device. When the new virtual machine starts, it may be assigned some resources of the peripheral device, including a set of traffic counters. At step 404, the peripheral device can reset the traffic counters associated with the new virtual machine, so that the traffic counters are ready to transactions received from the new virtual machine.

At step 406, the peripheral device may receive a transaction request from the virtual machine. The transaction request may indicate that the virtual machine desires that the peripheral device process a certain number of transactions. For example, at step 406, the virtual machine may write a doorbell register in the peripheral device, where the value written to the doorbell register indicates a number of transactions.

At step 408, the peripheral device can receive traffic, such as doorbell writes, I/O read or write transactions, and/or memory read or write transactions (among others) from the virtual machine. The traffic received at step 408 can include transactions associated with the request received at step 406. At step 410, the peripheral device can increment the appropriate traffic counters to count this traffic. The process 400 then returns to step 406, when additional traffic is received from the virtual machine.

When the new virtual machine starts, the peripheral device can also, at step 412, start a rate counter for the new virtual machine. For example, the peripheral device can associate a rate counter with the new virtual machine, as well as a time limit, and then reset the rate counter so that the rate counter can start counting time. The rate counter may then count milliseconds, microseconds, or some other fraction of a second until, at step 414, the rate counter reaches the time limit.

At step 416, the peripheral device may determine whether the virtual machine is exceeding a usage limit. For example, the peripheral device may check a number of transactions sent by the virtual machine during the time counted by the rate counter. When the peripheral device determines that the virtual machine's usage is not excessive, the peripheral device can proceed to step 418, and reset the rate counter. The process 400 can then return to step 414, when the rate counter reaches the time limit.

When the process returns again to step 416, the peripheral device can again check the usage of the peripheral device by the virtual machine. For example, the peripheral device can determine whether the same virtual machine was using the peripheral device the last time the process reached step 416. In this example, when the same virtual machine is using the peripheral device when the process 400 reaches step 416 two consecutive times, it may be that the same virtual machine has been using the peripheral device the entire duration counted by the rate counter.

When, at step 416, the peripheral device determines that the virtual machine may be exceeding a usage limit of the peripheral device, the peripheral device can, at step 420, read the traffic counters for the virtual machine. The values in the traffic counters can indicate an actual number of transactions, as well as aspects of those transactions (e.g., the amount of data associated with each transaction, a type of the transaction, etc.). The actual number of transactions may differ from the number of transactions requested, for example, at step 406.

At step 422, the peripheral device can verify, using the values from the traffic counters, usage of the peripheral device by the virtual machine. For example, the peripheral device can compare a requested number of transactions against an actual number of transactions. When the actual number of transactions does not exceed the requested number of transactions, the peripheral device may determine that the virtual machine is not misbehaving. The process 400 may then proceed to step 418, where the peripheral device resets the rate counter. The process 400 may then return to step 414 when the rate counter reaches the time limit.

Returning to step 422, the peripheral device may determine that the virtual machine is misbehaving. For example, the peripheral device may determine that the actual number of transactions sent by the virtual machine (e.g., at step 408) may be the same as or conforms with the number of transactions requested by the virtual machine (e.g., at step 406), but that the request number of transactions exceeds a usage limit. In either case, the process 400 can proceed to step 424, where the peripheral device can report the virtual machine or take action against the virtual machine. The peripheral device can, for example, report the virtual machine to the host device for the host device to take some action, and/or the peripheral device can report the virtual machine to a system administrator. The peripheral device can, alternatively or additionally, block additional traffic from the virtual machine, reduce the number of transactions it accepts from the virtual machine, or continue to process transactions from the virtual machine.

Figure 5:
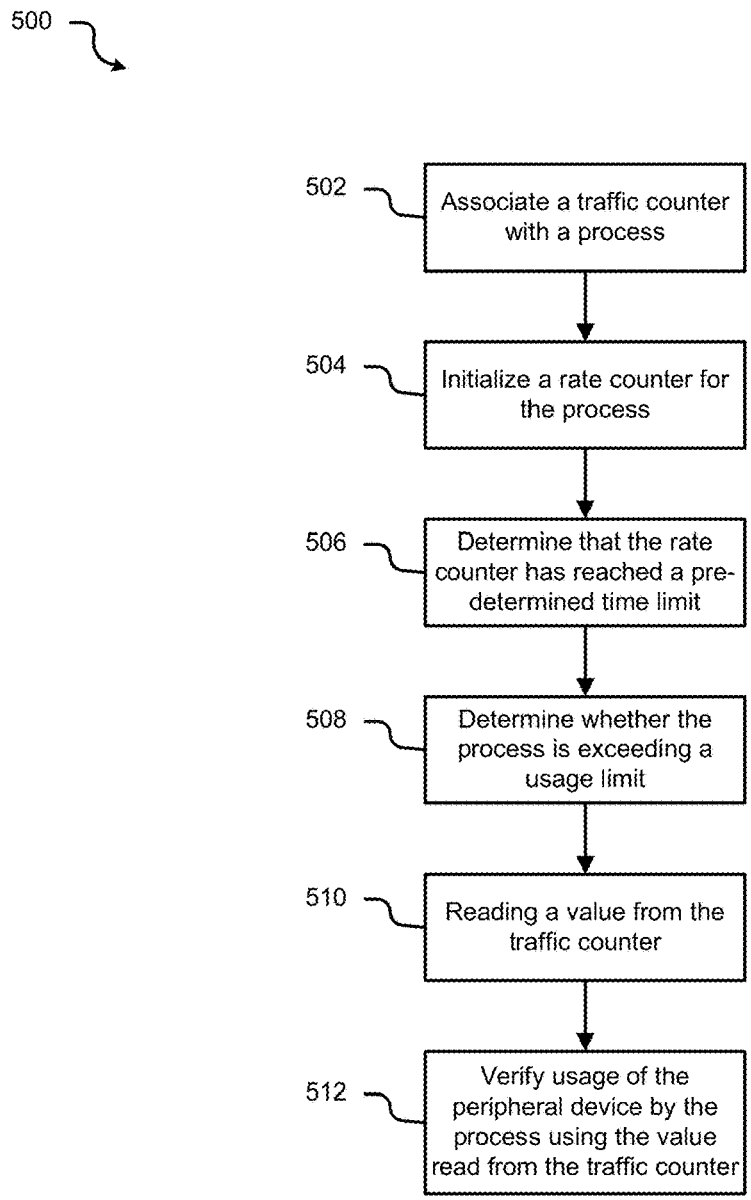
FIG. 5 illustrates an example of a process for monitoring usage of a peripheral device by a process executing on a host device.

FIG. 5 illustrates an example of a process 500 for monitoring usage of a peripheral device by a process executing on a host device. The process 500 may be implemented by the systems described above, such as for example the peripheral device described with respect to FIGS. 2 and 3.

At step 502 of FIG. 5, a peripheral device may associate a traffic counter with a process. The traffic counter may be included in an integrated circuit of the peripheral device. The process may be executing on a host device coupled to the peripheral device. For example, the process may be a virtual machine executing on the host device. The traffic counter may increment based on transactions received by the peripheral device. For example, the traffic counter may increment for each transaction received from the process or for each transaction of a certain type (e.g., read, write, I/O read, I/O write, memory read, memory write, configuration read, configuration write, doorbell write, etc.) received from the process. Alternatively, the traffic counter may count the amount of data associated with each transaction, an address used by each transaction, an address region used by each transaction, an address boundary crossed by each transaction, or some other aspect of the transactions.

At step 504, the peripheral device may initialize a rate counter for the process. Initializing the rate counter may include setting the rate counter to zero and assigning the rate counter to the process. The rate counter may increment based on time. For example, the rate counter may count microseconds or milliseconds or some other fraction of a second.

At step 506, the peripheral device may determine that the rate counter has reached a pre-determined time limit. For example, the time limit may be reached when the rate counter counts to 60 milliseconds or 1 microsecond. The time limit can be configurable. A different time limit can be used for each process executing on the host device.

At step 508, the peripheral device can determine whether the process is exceeding a usage limit. For example, the peripheral device can check a current usage of the peripheral device by the process. The current usage can be indicated, for example, by a number of transactions that are pending from the process, that are waiting to be processed by the peripheral device. As another example, the peripheral device can check a past usage of the peripheral device by the process. For example, the peripheral device may have a registers that track the total number of transactions and/or bandwidth used by one process, where these registers reset when another process starts using the peripheral device. As another example, the peripheral device may check whether the process currently using the peripheral device is the same as the process that was using the peripheral device the last time the rate counter reached the time limit.

At step 510, the peripheral device may read a value from the traffic counter. In some cases, the peripheral device may read the value from the traffic counter in response to determining that the process is exceeding the usage limit.

At step 512, the peripheral device may verify usage of the peripheral device by the process, using the value read from the traffic counter. For example, the peripheral device may compare the value read from the traffic counter against a number of transactions requested by the process. When the value read from the traffic counter is greater than the number of transactions requested, the process may be found to be exceeding an allotted use of the peripheral device. As another example, the peripheral device may determine that the value read from the traffic counter is less than or equal to the number of transactions requested by the process. In this example, the peripheral device may nevertheless determine that the process is exceeding an allotted use of the peripheral device based number of transactions requested by the process. For example, the number of transactions may exceed the allotted use.

In various implementations, when the peripheral device determines that the process is exceeding an allotted use of the peripheral device, the peripheral device may take an action. For example, the peripheral device may report the process to the host device and/or a system administrator. Alternatively or additionally, the peripheral device may block further transactions from the process or may reduce the number of transactions that it accepts from the process.

Figure 6:
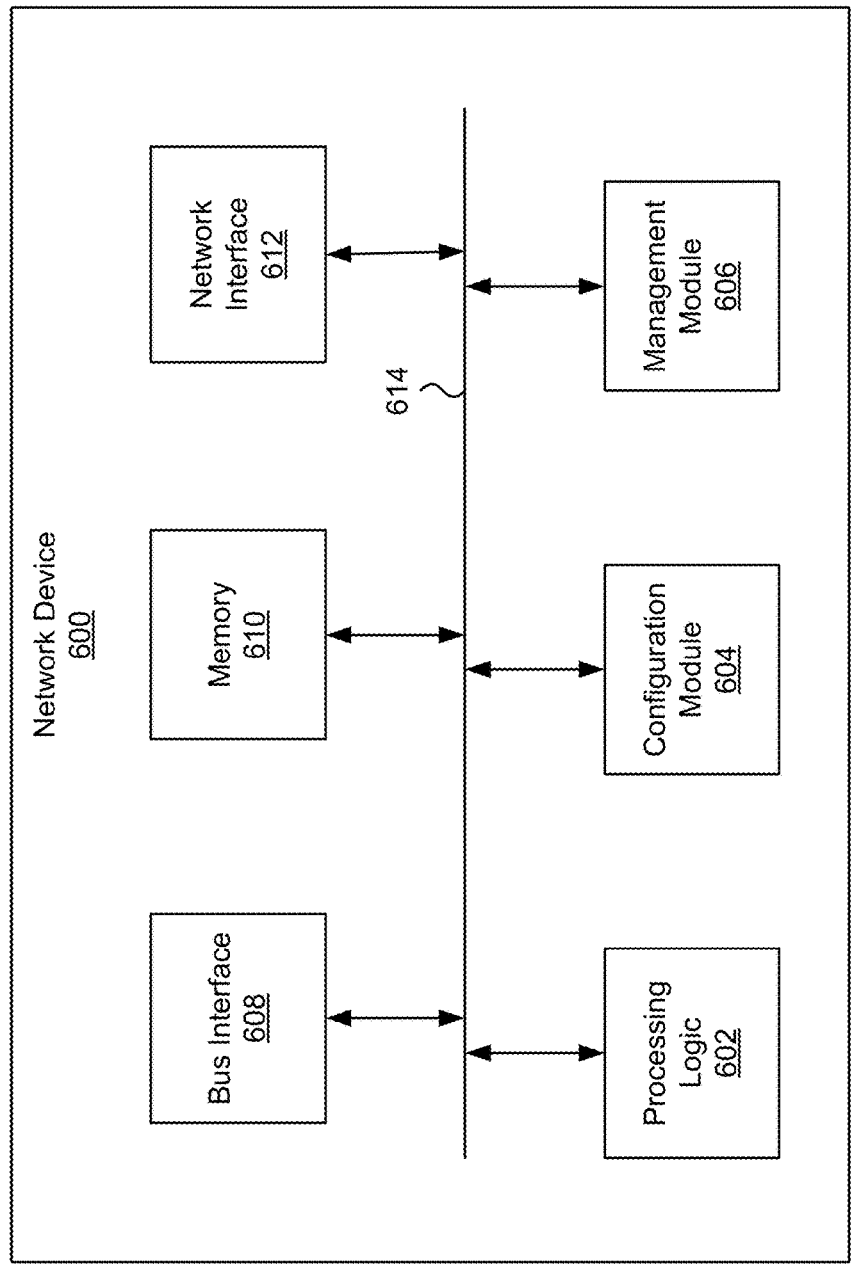
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. For example, the network device 600 can include the functionality of the peripheral devices discussed above. A network device 600, as illustrated in FIG. 6, may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 7. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMID®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
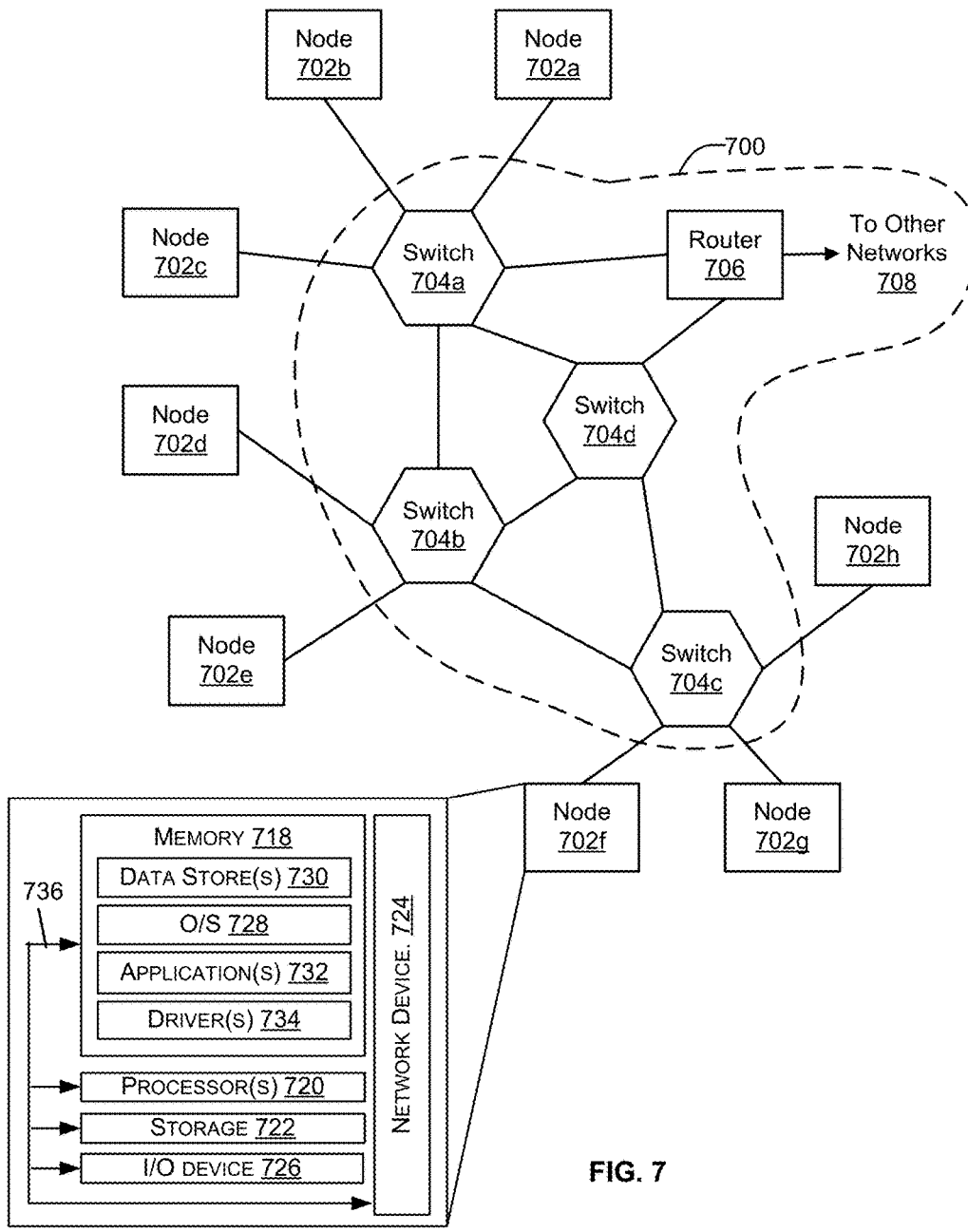
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources.

These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702a-702h may include at least one memory 718 and one or more processing units (or processor(s)) 720. The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702a-702h, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702a-702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700.

The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device.

A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Peripheral Component Interconnect (PCI)-based device, comprising:
 a bus interface coupled to a host device;
 an integrated circuit including a plurality of traffic counters, wherein the plurality of traffic counters are incremented based on transactions received at the bus interface; and
 an integrated circuit device configured to:
  initialize a set of traffic counters from the plurality of traffic counters;
  associate the set of traffic counters with a virtual machine, wherein the virtual machine is executing on the host device;
  initialize a rate counter for the virtual machine, wherein the rate counter increments based on time; and
  upon determining that the rate counter has reached a pre-determined time limit:
   determine that the virtual machine is exceeding a usage limit, wherein the usage limit is associated with an amount of traffic received by the PCI-based device from the virtual machine;
   read values from the set of traffic counters;
   determine, using the values read from the set of traffic counters, an amount of traffic sent by the virtual machine; and
   verify usage of the PCI-based device by the virtual machine by comparing the amount of traffic sent by the virtual machine against a number of transactions reported by the virtual machine to the PCI-based device, the number of transactions representing a requested usage of the PCI-based device.

2. The PCI-based device of claim 1, wherein the integrated circuit device is further configured to:
 confirm the virtual machine usage of the PCI-based device; and
 take an action, wherein the action includes one or more of blocking further usage of the PCI-based device by the virtual machine, limiting usage of the PCI-based device by the virtual machine, or reporting the virtual machine.

3. The PCI-based device of claim 1, wherein the integrated circuit device is a processor, a System-on-a-Chip (SoC), an Application Specific Integrated Circuit (ASIC), or a Field Programmable Gate Array (FPGA).

4. A Peripheral Component Interconnect (PCI)-based peripheral device, comprising:
 an integrated circuit including a traffic counter, wherein the traffic counter increments based on transactions received by the PCI-based peripheral device; and
 an integrated circuit device configured to:
  associate the traffic counter with a process, wherein the process is a virtual machine executing on a host device coupled to the PCI-based peripheral device;
  initialize a rate counter for the process, wherein the rate counter increments based on time; and
  upon determining that the rate counter has reached a pre-determined time limit:
   determine that the process is exceeding a usage limit;
   read a value from the traffic counter;
   determine, using the value read from the traffic counter, an amount of traffic sent by the process; and
   verify usage of the peripheral device by the process by comparing the amount of traffic against a number of transactions reported to the PCI-based peripheral device, the number of transactions representing a requested usage of the PCI-based peripheral device.

5. The PCI-based peripheral device of claim 4, wherein the traffic counter counts a type of the transactions.

6. The PCI-based peripheral device of claim 4, wherein the traffic counter counts an aspect of the transactions, wherein the aspect of the transactions includes a type of the transaction, an amount of data associated with the transaction, an address associated with the transaction, a boundary of the address associated with the transaction, or an address region of the address associated with the transaction.

7. The PCI-based peripheral device of claim 4, wherein the traffic counter counts effects of the transactions, wherein the effects include a manner in which the transactions use the peripheral device.

8. The PCI-based peripheral device of claim 4, wherein the rate counter increments in fractions of a second.

9. The PCI-based peripheral device of claim 4, wherein the integrated circuit device is configured to determine that the process is exceeding the usage limit by:
 determining an amount of traffic being received from the process at a point in time when the rate counter reaches the pre-determined time limit; and
 comparing the amount of traffic against the usage limit.

10. The PCI-based peripheral device of claim 4, wherein the integrated circuit device is further configured to:
 determine, using the value read from the traffic counter, that the process sent a number of transactions less than or equal to a number of transactions requested by the process; and
 determine that the process is exceeding the usage limit based on the number of transactions requested by the process.

11. The PCI-based peripheral device of claim 4, wherein the integrated circuit device is further configured to:
 confirm that the process is exceeding an allotted usage of the PCI-based peripheral device; and
 take an action based on the confirming.

12. A method, comprising:
 associating a traffic counter with a process, wherein the traffic counter is included in an integrated circuit of a Peripheral Component Interconnect (PCI)-based peripheral device, wherein the process is a virtual machine executing on a host device coupled to the peripheral device, and wherein the traffic counter increments based on transactions received by the peripheral device;
 initializing a rate counter for the process, wherein the rate counter increments based on time; and
 upon determining that the rate counter has reached a pre-determined time limit:
  determining that the process is exceeding a usage limit;
  reading a value from the traffic counter when the process is exceeding the usage limit; and verifying usage of the peripheral device by comparing the value read from the traffic counter against a number of transactions requested by the process, wherein, when the value read from the traffic counter is greater than the number of transactions, the process is exceeding an allotted use of the PCI-based peripheral device.

13. The method of claim 12, wherein verifying usage of the peripheral device by the process further includes:
  determining that the value read from the traffic counter is less than or equal to the number of transactions requested by the process; and
  determining that the process is exceeding the allotted use of the PCI-based peripheral device based on the number of transactions exceeding the allotted use.

14. The method of claim 12, further comprising:
  determining that the process is exceeding the usage limit based on a current usage of the peripheral device by the process.

15. The method of claim 12, further comprising:
  determining that the process is exceeding the usage limit based on past usage of the peripheral device by the process.

16. The method of claim 12, wherein the traffic counter counts a number of transactions from the process, aspects of transactions from the process, or effects caused by transactions from the process.

17. The PCI-based peripheral device of claim 4, wherein the integrated circuit device is further configured to:
  determine that the value read from the traffic counter is less than or equal to the number of transactions; and
  determine that the process is exceeding an allotted use of the PCI-based peripheral device based on the number of transactions exceeding the allotted use.

18. The method of claim 12, wherein the traffic counter counts a number of the transactions.

19. The method of claim 12, further comprising:
  determining an amount of traffic being received from the process at a point time when the rate counter reaches the pre-determined time limit; and
  determining that the process is exceeding the usage limit comparing the amount of traffic against the usage limit.

20. The method of claim 12, further comprising:
  confirming that the process is exceeding the allotted use of the PCI-based peripheral device; and
  taking an action based on the confirming.

\* \* \* \* \*